United States Patent
Mimura et al.

(10) Patent No.: US 6,817,724 B2
(45) Date of Patent: Nov. 16, 2004

(54) TRIANGULAR PYRAMIDAL CUBE CORNER RETROREFLECTION ELEMENT

(75) Inventors: Ikuo Mimura, Uozu (JP); Yutaka Hamada, Namerikawa (JP); Takashi Yoshioka, Namerikawa (JP); Akihiro Matsuda, Uozu (JP)

(73) Assignee: Nippon Carbide Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/182,526

(22) PCT Filed: Jan. 19, 2001

(86) PCT No.: PCT/JP01/00333

§ 371 (c)(1),
(2), (4) Date: Jul. 31, 2002

(87) PCT Pub. No.: WO01/57560

PCT Pub. Date: Aug. 9, 2001

(65) Prior Publication Data

US 2003/0021029 A1 Jan. 30, 2003

(30) Foreign Application Priority Data

Jan. 31, 2000 (JP) ........................................ 2000-059575

(51) Int. Cl.[7] .............................................. G02B 5/122
(52) U.S. Cl. ......................... 359/529; 359/530; 428/156
(58) Field of Search ................................ 359/529–530; 428/156

(56) References Cited

U.S. PATENT DOCUMENTS

| | | | |
|---|---|---|---|
| 2,310,790 A | 2/1943 | Jungersen | |
| 2,380,447 A | 7/1945 | Jungersen | |
| 2,481,757 A | 9/1949 | Jungersen | |
| 3,190,178 A | 6/1965 | McKenzie | |
| 3,712,706 A | 1/1973 | Stamm | |
| 3,830,682 A | 8/1974 | Rowland | ........................ 161/2 |
| 4,025,159 A | 5/1977 | McGrath | |
| RE29,396 E | 9/1977 | Heenan | ........................ 204/281 |
| 4,349,598 A | 9/1982 | White | |

(List continued on next page.)

FOREIGN PATENT DOCUMENTS

| | | |
|---|---|---|
| EP | 0 137 736 | 4/1985 |
| EP | 0 175 031 | 3/1986 |
| EP | 0 548 280 | 6/1993 |
| EP | 96/10197 | 4/1996 |
| EP | 0 830 621 | 11/2001 |
| EP | 1 164 390 | 12/2001 |
| GB | 441319 | 12/1933 |
| JP | 63-143502 | 6/1988 |
| JP | 11-305017 | 11/1999 |
| WO | 92/04647 | 3/1992 |
| WO | WO 95/14091 | 6/1994 |
| WO | WO 95/11463 | 4/1995 |
| WO | WO 95/11465 | 4/1995 |
| WO | WO 95/11470 | 4/1995 |

*Primary Examiner*—James Phan
(74) *Attorney, Agent, or Firm*—Fitzpatrick, Cella, Harper & Scinto

(57) ABSTRACT

To provide a triangular-pyramidal cube-corner retroreflective elements extremely superior in reflectivity at an entrance angle of 30° or more, preferably 40° or more. Triangular-pyramidal cube-corner retroreflective elements characterized in that when assuming the height from a bottom plane ($S_x$–$S_x'$) including base edges (x,x, . . . ) shared by two triangular-pyramidal reflective elements faced each other up to apexes ($H_1$ and $H_2$) of the triangular-pyramidal reflective elements as $h_x$, the height from a bottom plane ($S_y$–$S_y'$) including other base edges (y,y, . . . ) of the triangular-pyramidal reflective elements as $h_y$, and the height from a bottom plane ($S_z$—$S_z$) including still other base edges (z,z . . . ) of the triangular-pyramidal reflective elements as $h_z$, any two of $h_x$, $h_y$, and $h_z$ are substantially different from each other and a mirror reflective layer is formed on surfaces of the triangular-pyramidal reflective elements.

11 Claims, 5 Drawing Sheets

U.S. PATENT DOCUMENTS

| | | | |
|---|---|---|---|
| 4,498,733 A | 2/1985 | Flanagan | |
| 4,588,258 A | 5/1986 | Hoopman | |
| 4,775,219 A | 10/1988 | Appeldorn et al. | |
| 4,801,193 A | 1/1989 | Martin | |
| 4,897,136 A | 1/1990 | Bailey et al. | 156/145 |
| 5,064,272 A | 11/1991 | Bailey et al. | 359/541 |
| 5,122,902 A | 6/1992 | Benson | 359/529 |
| 5,138,488 A | 8/1992 | Szczech | 359/529 |
| 5,264,063 A | 11/1993 | Martin | 156/247 |
| 5,376,431 A | 12/1994 | Rowland | 428/164 |
| 5,557,836 A | 9/1996 | Smith et al. | 29/527.4 |
| 5,564,870 A | 10/1996 | Benson et al. | 409/131 |
| 5,600,484 A | 2/1997 | Benson et al. | 359/529 |
| 5,696,627 A | 12/1997 | Benson et al. | 359/529 |
| 5,706,132 A | 1/1998 | Nestegard et al. | 359/529 |
| 5,721,640 A | 2/1998 | Smith et al. | 359/530 |
| 5,764,413 A | 6/1998 | Smith et al. | 359/530 |
| 5,831,767 A | 11/1998 | Benson et al. | 359/529 |
| 5,840,405 A | 11/1998 | Shusta et al. | 428/156 |
| 5,840,406 A | 11/1998 | Nilsen | 428/156 |
| 5,844,712 A | 12/1998 | Caroli | 359/529 |
| 5,854,709 A | 12/1998 | Couzin | 359/529 |
| 5,888,618 A * | 3/1999 | Martin | 428/156 |
| 5,889,615 A | 3/1999 | Dreyer et al. | 359/529 |
| 5,898,523 A | 4/1999 | Smith et al. | 359/530 |
| 5,914,812 A | 6/1999 | Benson et al. | 359/529 |
| 5,981,032 A | 11/1999 | Smith et al. | 428/167 |
| 5,988,820 A | 11/1999 | Huang et al. | |
| 6,036,322 A | 3/2000 | Nilsen et al. | 359/529 |
| 6,083,607 A | 7/2000 | Mimura et al. | 428/167 |
| 6,120,280 A | 9/2000 | Mimura et al. | 425/195 |
| 6,155,689 A | 12/2000 | Smith | |
| 6,206,525 B1 | 3/2001 | Rowland et al. | |
| 6,390,629 B1 * | 5/2002 | Mimura et al. | 359/530 |

* cited by examiner (a)

(b)

(a)

(b)

TRIANGULAR PYRAMIDAL CUBE CORNER RETROREFLECTION ELEMENT

TECHNICAL FIELD

The present invention relates to triangular-pyramidal cube-corner retroreflective elements having a novel structure and a triangular-pyramidal cc retroreflective assembly in which the triangular-pyramidal cube-corner retroreflective elements are arranged. More minutely, the present invention relates to retroreflective elements (hereafter simply referred to as retroreflective elements or reflective elements) such as triangular-pyramidal cube-corner retroreflective elements constituting a retroreflective body useful for reflectors such as signs including traffic signs and construction work signs, visible tapes of vehicles and motorcycles, safety materials of clothing and life preservers, markings of signboards, and reflectors of visible light, laser beam, or infrared-ray reflective sensors, and an assembly of the retroreflective elements.

Still more minutely, the present invention relates to triangular-pyramidal cube-corner retroreflective elements characterized in that triangular-pyramidal cube-corner retroreflective elements protruding beyond a common bottom plane ($S_x$–$S_x'$) share one base edge (x) on the bottom plane ($S_x$–$S_x'$) and are arranged in the closest-packed state so as to be faced each other, the bottom plane ($S_x$–$S_x'$) is a common plane including a plurality of the base edges (x,x, ...) shared by the triangular-pyramidal reflective elements, two triangular-pyramidal reflective elements faced each other include the shared base edges (x,x, ...) on the bottom plane ($S_x$–$S_x'$) and form a substantially same-shape element pair faced each other so as to be symmetric to planes ($L_x$—$L_x$, $L_x$—$L_x$, ...) vertical to the bottom plane ($S_x$–$S_x'$), and when assuming the height from the bottom plane ($S_x$–$S_x'$) including the base edges (x,x, ...) shared by the two triangular-pyramidal reflective elements faced each other up to apexes ($H_1$ and $H_2$) of the triangular-pyramidal reflective elements as $h_x$, the height from a bottom plane ($S_y$–$S_y'$) including other base edges (y,y, ...) of the triangular-pyramidal reflective elements up to the apexes ($H_1$ and $H_2$) of the triangular-pyramidal reflective elements as $h_y$, and the height from a bottom plane ($S_z$–$S_z'$) including still other base edges (z,z, ...) of the triangular-pyramidal reflective elements up to the apexes ($H_1$ and $H_2$) of the triangular-pyramidal reflective elements as $h_z$, at least any two of $h_x$, $h_y$, and $h_z$ are substantially different from each other and a mirror reflective layer is formed on reflective side faces of the triangular-pyramidal reflective elements.

BACKGROUND ART

A retroreflective body for reflecting entrance light toward a light source has been well known so far and the reflective body using its retroreflectivity is widely used in the above industrial fields. Particularly, a triangular-pyramidal cube-corner retroreflective body (hereafter also referred to as a CC reflective body) using the internal-total-reflection theory such as triangular-pyramidal cube-corner retroreflective elements (hereafter also simply referred to as triangular-pyramidal reflective elements or CC reflective elements) are remarkably superior to a retroreflective body using conventional micro glass beads in retroreflective efficiency of light and thereby, uses of the triangular-pyramidal cube-corner retroreflective elements have been increased year by year because of its superior retroreflective performance.

However, though conventional publicly-known triangular-pyramidal retroreflective elements show a preferable retroreflective efficiency when an angle formed between the optical axis (axis passing through the apex of a triangle equally separate from three faces constituting triangular-pyramidal cube-corner retroreflective elements and inserting with each other at an angle of 90°) of the elements and an entrance ray is small because of the reflection theory of the elements, the retroreflective efficiency is suddenly lowered (that is, the entrance angle characteristic is deteriorated) as the entrance angle increases. Moreover, the light entering the face of the triangular-pyramidal reflective elements at an angle less than the critical angle ($\alpha_c$) meeting an internal-total-reflection condition decided in accordance with the refractive index of a transparent medium constituting the triangular-pyramidal reflective elements and that of air reaches the back of the elements without totally reflecting from the interface of the elements. Therefore, a retroreflective sheeting using triangular-pyramidal reflective elements generally has a disadvantage that it is inferior in entrance angularity.

However, because triangular-pyramidal retroreflective elements can reflect light in the direction in which the light enters over the almost entire surface of the elements, reflected light does not reflect by diverging at a wide angle due to spherical aberration like the case of micro-glass bead reflective elements. However, the narrow divergent angle of the reflected light easily causes a trouble that when the light emitted from a head lamp of an automobile retroreflects from a traffic sign, it does not easily reach, for example, eyes of a driver present at a position separate from the optical axis of the head lamp. The frequency of the above type of the trouble increases more and more (that is, observation angularity is deteriorated) because an angle (observation angle) formed between the entrance axis of rays and the axis connecting a driver with a reflection point increases.

Many proposals have been made so far for the above cube-corner retroreflective sheeting, particularly for a triangular-pyramidal cube-corner retroreflective sheeting and various improvements are studied.

For example, the specification of Jungersen's U.S. Pat. No. 2,481,757 discloses retroreflective elements assembly in which all base edges of triangular-pyramidal reflective elements are present on the same plane, the optical axis of each retroreflective elements tilts from the direction vertical to the basic plane, and a mirror reflective layer is formed on surfaces of prism side faces of the retroreflective elements. These retroreflective elements form a retroreflective element pair faced each other at the both sides of a shared base edge and the optical axis of the retroreflective element pair tilts in directions opposite to each other.

Moreover, the official gazette of Stamm's Japanese Patent Laid-Open No. Sho 49-106839 (specification of U.S. Pat. No. 3,712,706) discloses a retroreflective sheeting constituted by an assembly of normal triangular-pyramidal cube-corner retroreflective elements each of whose bottom planes is an equilateral triangle and on each of whose reflection-side surfaces a mirror reflective layer is formed. The optical axis of each of the retroreflective elements is vertical to the bottom plane of the elements.

The triangular-pyramidal cube-corner retroreflective elements in the above two proposals respectively have a mirror reflective layer on surfaces of their prism side faces. Therefore, incoming light hardly passes through retroreflective elements but it is substantially entirely reflected. Therefore, when comparing the above retroreflective elements with triangular-pyramidal cube-corner retroreflective elements having no mirror reflective layer according to only the internal total reflection theory, all rays to be retroreflected greatly increase and are superior in entrance angularity.

However, CC reflective elements designed so that the optical axis tilts have a problem that differences between areas of three reflective side faces (faces a, b, and c) excessively increase and the retroreflective performance is deteriorated.

The present inventor et al. have found in recent years that it is possible to improve the entrance angularity of a retroreflective sheeting constituted by the above retroreflective elements by substantially making the depth (h')[equal to the height of apexes ($H_1$ and $H_2$) from the bottom plane (X–X')] of the elements of a face (face c) having a base edge on the bottom plane (X–X') of the retroreflective elements substantially larger than the depth (h) of a face (virtual face Z–Z') including base edges (z, and w) of two faces substantially perpendicularly crossing with the face c of the triangular-pyramidal reflective elements from the apexes. The invention of the present inventor et al. is disclosed in the official gazette of U.S. Pat. No. 2,954,709.

However, also in the case of these elements, the trouble is not solved that when the entrance angle of entrance rays increases, the internal total-reflection condition is not satisfied and the entrance light does not reflect on the reflection side face but it passes through elements.

DISCLOSURE OF THE INVENTION

It is an object of the present invention to provide triangular-pyramidal cube-corner retroreflective elements (CC reflective elements) superior in retroreflective performance at an entrance angle of 30° or more, preferably at an angle of 40° or more.

According to the present invention, the above object and advantage are achieved by triangular-pyramidal cube-corner retroreflective elements characterized in that the triangular-pyramidal cube-corner retroreflective elements protruding beyond a common bottom plane ($S_x$–$S_x$') share one base edge (x) on the bottom plane ($S_x$–$S_x$') and are arranged in the closest-packed state so as to be faced each other, the bottom plane ($S_x$–$S_x$') is a common plane including a plurality of the base edges (x,x, . . . ) shared by the triangular-pyramidal reflective elements, two triangular-pyramidal reflective elements faced each other include the shared base edges (x,x, . . . ) on the bottom plane ($S_x$–$S_x$') and form a substantially same-shape element pair faced each other so as to be symmetric to planes ($L_x$—$L_x$, $L_x$—$L_x$, . . . ) vertical to the bottom plane ($S_x$–$S_x$'), and when assuming the height from the bottom plane ($S_x$–$S_x$') including the base edges (x,x, . . . ) shared by the two triangular-pyramidal reflective elements faced each other up to apexes ($H_1$ and $H_2$) of the triangular-pyramidal reflective elements as $h_x$, the height from a bottom plane ($S_y$–$S_y$') including other base edges (y,y, . . . ) of the triangular-pyramidal reflective elements up to the apexes ($H_1$ and $H_2$) of the triangular-pyramidal reflective elements as $h_y$, and the height from a bottom plane ($S_z$–$S_z$') including still other base edges (z,z, . . . ) of the triangular-pyramidal reflective elements up to the apexes ($H_1$ and $H_2$) of the triangular-pyramidal reflective elements as $h_z$, at least any two of $h_x$, $h_y$, and $h_z$ are substantially different from each other and a mirror reflective layer is formed on reflective side faces of the triangular-pyramidal reflective elements.

In the case of the present invention, triangular-pyramidal cube-corner retroreflective elements are preferable in which the optical axis of the triangular-pyramidal reflective elements tilts so that the angle formed between the optical axis and a vertical line extended from apexes ($H_1$ and $H_2$) of the elements to the bottom plane ($S_x$–$S_x$') of the optical axis ranges between 0.5° and 12° in the direction for the difference (q–p) between the distance (q) from the intersection (Q) of the optical axis and the bottom plane ($S_x$–$S_x$') up to base edges (x,x, . . . ) shared by the element pair and the distance (p) from the intersection (P) of the vertical line and the bottom plane $S_x$–$S_x$') up to the base edges (x,x, . . . ) shared by the element pair to become plus (+) or minus (−).

In the case of the present invention, triangular-pyramidal cube-corner retroreflective elements are preferable in which the optical axis of the triangular-pyramidal reflective elements tilts so that the angle formed between the optical axis and the above vertical line ranges between 0.5° and 1.5°.

In the case of the present invention, triangular-pyramidal cube-corner retroreflective elements are also preferable in which the optical axis of the triangular-pyramidal reflective elements tilts so that the angle formed between the optical axis and the above vertical line ranges between 4° and 12°.

More preferable triangular-pyramidal cube-corner retroreflective elements of the present invention are triangular-pyramidal cube-corner retroreflective elements in which the optical axis of the triangular-pyramidal reflective elements tilts in the direction for the difference (q–p) between the distance (q) from the intersection (Q) of the optical axis and the bottom plane ($S_x$–$S_x$') up to base edges (x,x, . . . ) shared by the element pair and the distance (p) from the intersection (P) of a vertical line extended from apexes ($H_1$ and $H_2$) of the elements to the bottom plane ($S_x$–$S_x$') and the bottom plane ($S_x$–$S_x$') up to the base edges (x,x, . . . ) shared by the element pair to become plus (+) and $h_x$ is substantially larger than $h_y$ and $h_z$.

Still more preferable triangular-pyramidal cube-corner retroreflective elements of the present invention are triangular cube-corner retroreflective elements in which the above $h_y$ and $h_z$ are substantially equal to each other and $h_x$ is substantially larger than $h_y$ and $h_z$.

Still more preferable triangular-pyramidal cube-corner retroreflective elements of the present invention are triangular-pyramidal cube-corner retroreflective elements in which the optical axis of the triangular-pyramidal reflective elements tilts in the direction for the difference (q–p) between the distance (q) from the intersection (Q) of the optical axis and the bottom plane ($S_x$–$S_x$') up to base edges (x,x, . . . ) shared by the element pair and the distance (p) from the intersection (P) of a vertical line extended from apexes ($H_1$ and $H_2$) of the elements to the bottom plane ($S_x$—$S_x$) and the bottom plane ($S_x$–$S_x$') up to base edges (x,x, . . . ) shared by the element pair to become minus (−) and $h_x$ is substantially smaller than $h_y$ and $h_z$.

Still more preferable triangular-pyramidal cube-corner retroreflective elements of the present invention are triangular-pyramidal cube-corner retroreflective elements in which the above $h_y$ and $h_z$ are substantially equal to each other and the above $h_x$ is substantially smaller than the above $h_y$ and $h_z$.

Still more preferable triangular-pyramidal cube-corner retroreflective elements of the present invention are triangular-pyramidal cube-corner retroreflective elements in which when assuming the maximum one of the above $h_x$, $h_y$, and $h_z$ as $h_{max}$ and the minimum one of them as $h_{min}$, the following expression is effectuated.

$$1.03 < h_{max}/h_{min} < 1.3$$

Still more preferable triangular-pyramidal cube-corner retroreflective elements of the present invention are triangular-pyramidal cube-corner retroreflective elements in which the above $h_x$, $h_y$, and $h_z$ respectively range between 50 and 500 μm (both included).

The present invention further provides a triangular-pyramidal cube-corner retroreflective sheeting in which the above two triangular-pyramidal cube-corner retroreflective elements faced each other are arranged in the closest-packed state to form a sheeting while sharing base edges (x,x, ... ).

The present invention is described below more minutely.

Figure 1:
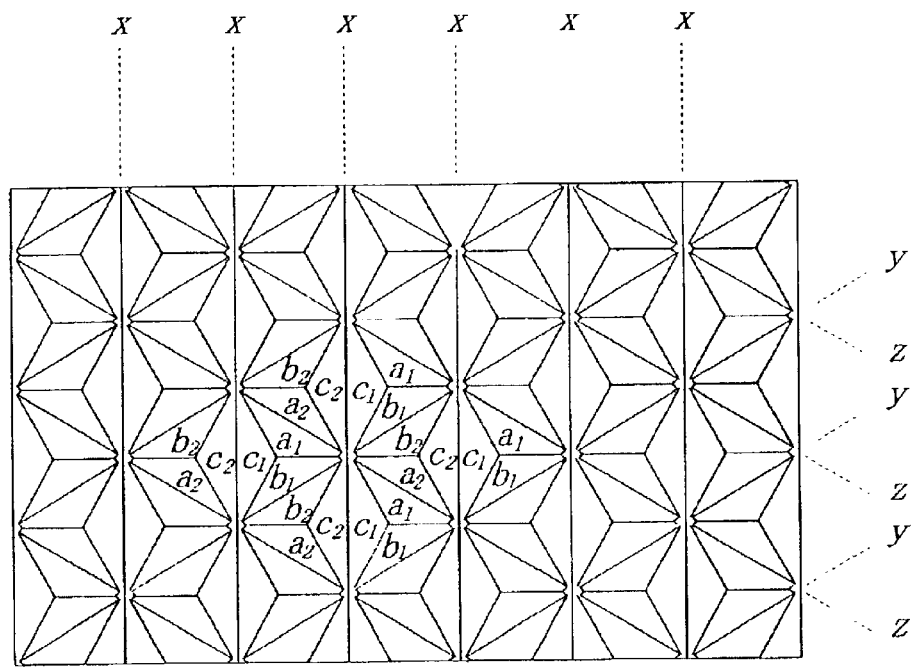
FIG. 1 is a top view of a CC retroreflective body in which a CC reflective element pair is set in which the base edge (x) of three base edges (x), (y), and (z) is formed more deeply than other base edges (y) and (z) and the optical axis tilts in the direction for the tilt of the optical axis to become plus (+)

Symbols in the drawings are described below.

1: Surface protective layer
2: Print layer
3: Retroreflective-element layer
4: Mirror reflective layer
5: Adhesive layer
6: Stripping-material layer
7: Cube-corner retroreflective element pair
8: Entrance light
$a_1$, $a_2$, $b_1$, $b_2$, $c_1$, $c_2$: Reflection side face of triangular-pyramidal reflective elements
$H_1$, $H_2$: Apex of retroreflective elements
$h_x$: Height from bottom plane ($S_x$–$S_x'$) including base edges (x,x, ... ) up to apexes ($H_1$ and $H_2$)
$h_y$: Height from bottom plane ($S_x$–$S_x'$) including base edges (y,y, ... ) up to apexes ($H_1$ and $H_2$)
$h_z$: Height from bottom plane ($S_x$–$S_x'$) including base edges (x,x, ... ) up to apexes ($H_1$ and $H_2$)
$L_x$: Symmetric face of planar retroreflective element pair including one base edge (x) shared by reflective elements $R_1$ and $R_2$ on one bottom plane ($S_x$–$S_x'$) shared by the elements $R_1$ and $R_2$ and vertical to the shared bottom plane ($S_x$–$S_x'$)
P: Intersection of vertical line extended from apexes ($H_1$ and $H_2$) of retroreflective elements to bottom plane ($S_x$) of the elements and the bottom plane ($S_x$)
Q: Intersection of optical axis and bottom plane ($S_x$) of retroreflective elements
p: Distance from point (P) up to base edge (x) shared by CC reflective element pair
q: Distance from point (Q) up to base edge (x) shared by CC reflective element pair
$R_1$, $R_2$: Retroreflective element (Pair)
x, y, z: Base edge of retroreflective elements
θ: Tilt angle of optical axis of retroreflective elements

DETAILED DESCRIPTION OF THE INVENTION

Figure 2:
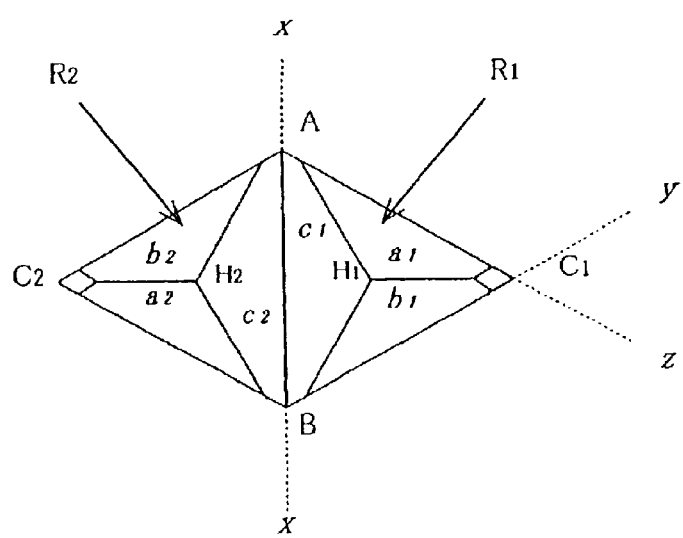
FIG. 2(a) is a top view of a pair of the CC reflective elements of the CC retroreflective body shown in FIG. 1
FIG. 2(b) is a sectional view of the CC reflective element pair.
Figure 2:
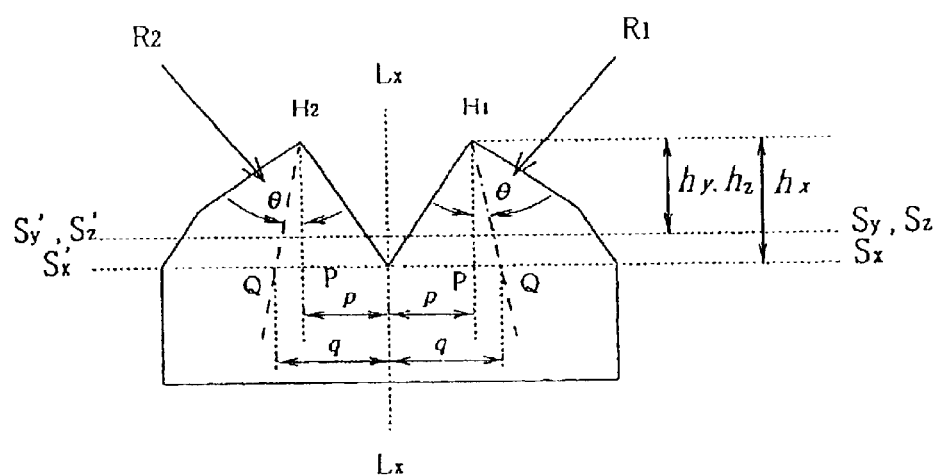

FIG. 1 and FIGS. 2(a) and 2(b) show one mode of a pair of triangular-pyramidal cube-corner retroreflective elements $R_1$ and $R_2$. FIG. 1 is a top view of a CC retroreflective body in which CC reflective elements are arranged, FIG. 2(a) is a top view showing a pair of the CC reflective elements shown in FIG. 1, and FIG. 2(b) is a sectional view of the reflective elements $R_1$ and $R_2$ cut at a plane vertical to a common bottom plane ($S_x$–$S_x'$) including points $C_2$, $H_2$, $H_1$, and $C_1$ in FIG. 2(a) and base edges (x,x, ... ) shared by many pairs of reflective elements.

In FIG. 1, $a_1$, $b_1$, $c_1$, $a_2$, $b_2$, and $c_2$ denote arranged reflective elements such as reflection side faces of the reflective elements $R_1$ and $R_2$ in FIG. 2(a), x denotes an adjacent reflective element such as base edge shared by the reflection side faces (face $c_1$) and (face $c_2$) of $R_1$ and $R_2$, y denotes a base edge shared by a reflection side face (face $b_1$) and another reflection side face (face $b_2$) of an adjacent reflective element separate from $R_1$ and $R_2$, and z denotes a base edge shared by still another reflection side faces ($a_1$) and ($a_2$) of a separate adjacent reflective element. Adjacent reflective elements sharing the above base edges (x,x, ... ) form a substantially-same-shaped element pair including the above base edges (x,x, ... ) and faced each other so as to be substantially symmetric to planes ($L_x$—$L_x$, $L_x$—$L_x$, ... ) vertical to the bottom plane ($S_x$–$S_x'$) and are arranged on the bottom plane ($S_x$–$S_x'$) in the closest-packed state so as to be faced each other.

Moreover, in FIGS. 2(a) and 2(b), $H_1$ and $H_2$ denote apexes of cube corners of the reflective elements $R_1$ and $R_2$, a dotted line ($H_1$-P) denotes a vertical line extended from the apex $H_1$ of the reflective element $R_1$ to the bottom plane ($S_x$–$S_x'$), and a dotted line ($H_1$-Q) denotes an optical axis passing through the apex $H_1$ of the reflective element $R_1$. Therefore, the tilt of the optical axis of the reflective element $R_1$ is shown by θ.

The line x—x in FIG. 2(a) shows one base edge (x,x, ... ) shared by reflective elements $R_1$ and $R_2$ on one bottom plane ($S_x$–$S_x'$) shared by the CC reflective elements $R_1$ and $R_2$. In FIG. 2(b), the intersection of the vertical line extended from apexes of the reflective elements to the bottom plane ($S_x$–$S_x'$) and the bottom plane ($S_x$–$S_x'$) is shown by P and the intersection of the optical axis through the apex $H_1$ of the reflective element $R_1$ and the bottom plane ($S_x$–$S_x'$) is shown by Q.

In FIG. 2(b), the plane ($L_x$—$L_x$) is a plane including a base edge (x) shared by the both elements $R_1$ and $R_2$ on a plane ($S_x$–$S_x'$) shared by the reflective elements $R_1$ and $R_2$ and vertical to the shared plane ($S_x$–$S_x'$)

The reflective elements $R_1$ and $R_2$ form a substantially-same-shaped element pair faced each other so as to be substantially symmetric to the above plane ($L_x$—$L_x$) vertical to the bottom plane ($S_x$–$S_x'$). The same is applied to FIGS. 3(a) and 3(b) to be described later.

In the case of the present invention, the fact that the tilt [angle from the vertical line ($H_1$-P)] of the optical axis ($H_1$-Q) of a reflective element such as the reflective element $R_1$ is plus (+) denotes that (q–p) is plus (+), the fact that the tilt is minus (–) denotes that (q–p) is minus (–), and the fact that (q–p) is equal to 0 denotes that the optical axis is orthogonal to the common bottom plane ($S_x$–$S_x'$) including base edges (x,x, . . . ) of many reflective element pairs.

As shown in FIG. 2(b), optical axes ($H_1$-Q and $H_2$-Q) of the CC reflective element pair tilt in the direction for the difference (q–p) between the distance (p) from the intersection (P) of the vertical line extended from the apexes ($H_1$ and $H_2$) of the CC reflective elements to the bottom plane ($S_x$–$S_x'$) and the bottom plane ($S_x$–$S_x'$) up to the base edge (x) shared by the CC reflective element pair and the distance (q) from the intersection (Q) of the optical axis and the bottom plane ($S_x$–$S_x'$) up to the base edge (x) shared by the CC reflective element pair to become plus (+).

Moreover, in FIG. 2(b), the dotted line ($S_x$–$S_x'$) denotes a bottom plane including many base edges (x,x, . . . ), the dotted line $S_y$–$S_y'$ denotes a bottom plane including many base edges (y,y, . . . ), and the dotted line $S_z$–$S_z'$ denotes a bottom plane including many base edges (z,z, . . . ). Moreover, $h_x$ denotes the height from the bottom plane ($S_x$–$S_x'$) including base edges (x,x, . . . ) shared by two triangular-pyramidal reflective elements faced each other up to apexes ($H_1$, and $H_2$) of the triangular-pyramidal reflective elements, $h_y$ denotes the height from the bottom plane ($S_y$–$S_y'$) including other base edges (y,y, . . . ) up to apexes ($H_1$ and $H_2$) of the triangular-pyramidal reflective elements, and $h_z$ denotes the height from the bottom plane ($S_z$–$S_z'$) including still other base edges (z,z, . . . ) of the triangular-pyramidal reflective elements up to apexes ($H_1$ and $H_2$) of the triangular-pyramidal reflective elements.

In the case of one of the modes of the present invention, the bottom plane ($S_x$–$S_x'$) is present at a position lower than the bottom planes ($S_y$–$S_y'$) and ($S_z$–$S_z'$) and the bottom planes ($S_y$–$S_y'$) and ($S_z$–$S_z'$) are present on the same plane. That is, $h_x$ is larger than $h_y$ and $h_z$ and $h_y$ and $h_z$ are equal to each other.

Therefore, the reflection side faces ($a_1$ and $a_2$) and ($b_1$ and $b_2$) have shapes slightly cut out by reflection side faces ($c_1$ and $c_2$), reflection side faces ($a_1$ and $a_2$) and ($b_1$ and $b_2$) are quadrangular, and reflection side faces ($c_1$ and $c_2$) are pentagonal.

A mirror reflective layer (4) is formed on surfaces of reflection side faces ($a_1$ and $a_2$), ($b_1$ and $b_2$), and ($c_1$ and $c_2$) of the triangular-pyramidal reflective elements.

Figure 3:
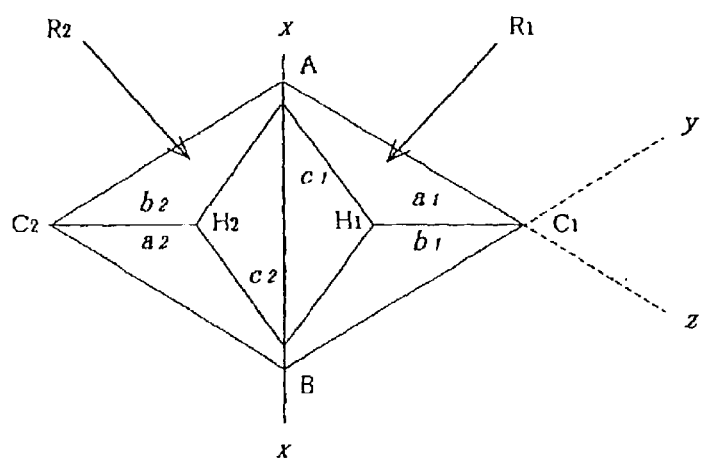
FIG. 3(a) is a top view of a pair of the CC reflective elements of the present invention in which the base edge (x) of three base edges (x), (y), and (z) is formed more shallowly than other base edges (y) and (z) and the optical axis tilts in the direction for the tilt of the optical axis to become minus (−)
FIG. 3(b) is a sectional view of the CC reflective element pair.
Figure 3:
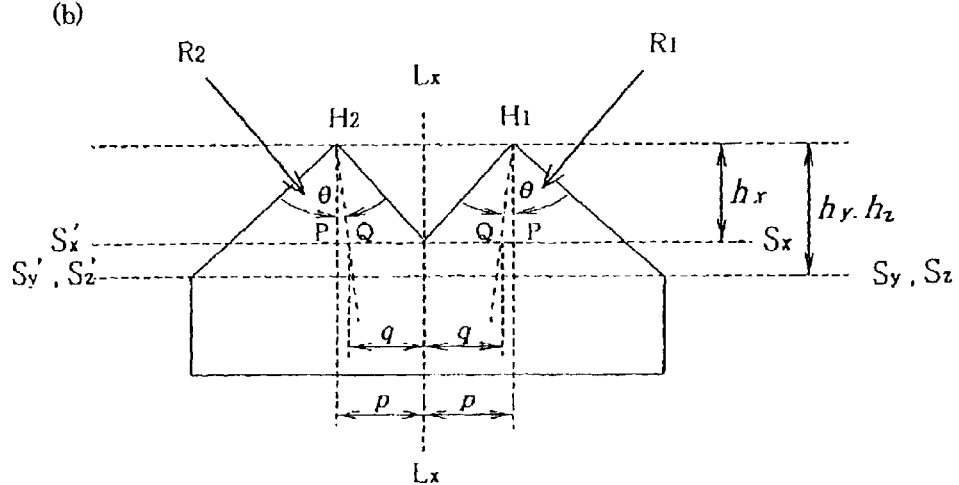

FIGS. 3(a) and 3(b) show still another mode of a pair of triangular-pyramidal cube-corner retroreflective elements (CC reflective elements) $R_1$ and $R_2$ of the present invention, in which FIG. 3(a) is a top view of one of the reflective elements and FIG. 3(b) is a sectional view of reflective elements $R_2$ and $R_1$ vertical to the common bottom plane ($S_x$–$S_x'$) including base edges (x,x, . . . ) including points $C_2$, $H_2$, $H_1$, and $C_1$ of FIG. 3(a) and shared by many reflective element pairs.

In FIGS. 3(a) and 3(b), the bottom plane ($S_x$–$S_x'$) including the base edges (x,x, . . . ) is present at a position higher than the bottom plane ($S_y$–$S_y'$) including the base edges (y,y, . . . ) and the bottom plane ($S_z$–$S_z'$) including the base edges (z,z, . . . ) and the bottom planes ($S_y$–$S_y'$) and ($S_z$–$S_z'$) are present on the same plane. That is, $h_x$ is smaller than $h_y$ and $h_z$ and $h_y$ and $h_z$ are equal to each other.

Therefore, reflection side faces ($c_1$ and $c_2$) have shapes slight cut out by reflection side faces ($a_1$ and $a_2$) and ($b_1$ and $b_2$), reflection side faces ($a_1$ and $a_2$) and ($b_1$ and $b_2$) are quadrangular, and reflection side faces ($c_1$ and $c_2$) are triangular.

Moreover, as shown in FIG. 3(b), optical axes ($H_1$-Q and $H_2$-Q) of the CC reflective element pair tilt in the direction for the difference (q–p) between the distance (p) from the intersection (P) of vertical lines ($H_1$-P and $H_2$-P) extended from apexes ($H_1$ and $H_2$) of the CC reflective elements to the bottom plane ($S_x$–$S_x'$) and the bottom plane ($S_x$–$S_x'$) up to the base edge (x) shared by the CC reflective element pair and the distance (q) from the intersection (Q) of the optical axes and the bottom plane ($S_x$–$S_x'$) up to the base edge (x) shared by the CC reflective element pair to become minus (–).

The present invention relates to triangular-pyramidal cube-corner retroreflective elements characterized in that triangular-pyramidal cube-corner retroreflective elements protruding beyond a common bottom plane ($S_x$–$S_x'$) share one base edge (x) on the bottom plane ($S_x$–$S_x'$) and are arranged in the closest-packed state so as to be faced each other, the bottom plane $S_x$–$S_x'$) is a common plane including a plurality of the base edges (x,x, . . . ) shared by the triangular-pyramidal reflective elements, two triangular-pyramidal reflective elements faced each other include the shared base edges (x,x, . . . ) on the bottom plane ($S_x$–$S_x'$) and form a substantially same-shape element pair faced each other so as to be symmetric to planes ($L_x$—$L_x$, $L_x$—$L_x$, . . . ) vertical to the bottom plane ($S_x$–$S_x'$), and when assuming the height from the bottom plane $S_x$–$S_x'$) including the base edges (x,x, . . . ) shared by the two triangular-pyramidal reflective elements faced each other up to apexes ($H_1$ and $H_2$) of the triangular-pyramidal reflective elements as $h_x$, the height from a bottom plane ($S_y$–$S_y'$) including other base edges (y,y, . . . ) of the triangular-pyramidal reflective elements up to the apexes ($H_1$ and $H_2$) of the triangular-pyramidal reflective elements as $h_y$, and the height from a bottom plane ($S_z$–$S_z'$) including still other base edges (z,z, . . . ) of the triangular-pyramidal reflective elements up to the apexes ($H_1$ and $H_2$) of the triangular-pyramidal reflective elements as $h_z$, at least any two of $h_x$, $h_y$, and $h_z$ are substantially different from each other and a mirror reflective layer is formed on reflective side faces of the triangular-pyramidal reflective elements.

It is allowed that any one of the heights $h_x$, $h_y$, and $h_x$ of the triangular-pyramidal reflective elements is different from others. However, to improve the entrance angularity, the heights can be properly selected so as to become large or small so that areas of reflection side faces ($a_1$, $b_1$, and $c_1$ and $a_2$, $b_2$, and $c_2$) become equal to each other.

When the optical axis of the triangular-pyramidal reflective elements tilts in the direction for the difference (q–p) between the distance (q) from the intersection (Q) of the optical axis and the bottom plane ($S_x$–$S_x'$) up to base edges (x,x, . . . ) shared by the element pair and the distance (p) from the intersection (P) of the vertical line extended from the apexes ($H_1$ and $H_2$) of the elements to the bottom plane ($S_x$–$S_x'$) and the bottom plane ($S_x$–$S_x'$) up to the base edges (x,x, . . . ) shared by the element pair to become plus (+), it is more preferable that $h_x$ is substantially larger than $h_y$ and $h_z$. However, when the optical axis tilts in the direction for (q–p) to become minus (–), it is still more preferable that $h_x$ is substantially smaller than $h_y$ and $h_z$.

Moreover, when at least two of the above $h_x$, $h_y$, and $h_z$ are substantially different from each other and it is assumed that the maximum one of the $h_x$, $h_y$, and $h_z$ is $h_{max}$ and the minimum one of them is $h_{min}$, it is preferable that the following expression is effectuated.

$$1.03 < h_{max}/h_{min} < 1.3$$

And it is more preferable that the following expression is effectuated.

$1.05 < h_{max}/h_{min} < 1.2$

In the case of CC reflective elements meeting the above $h_{max}/h_{min}$, it is possible to almost equalize areas of three reflection side faces (c1 and c2), (a1 and a2), and (b1 and b2) of the CC reflective elements and thereby improve the retroreflective performance of three-face-reflecting and retroreflecting.

It is preferable that the heights $h_x$, $h_y$, and $h_z$ of the above CC reflective elements range between 50 and 500 μm and more preferable that they range between 60 and 200 μm. When any one of the heights $h_x$, $h_y$, and $h_z$ is less than 50 μm, retroreflected light excessively diverges and the front brightness characteristic is deteriorated. However, when any one of the heights $h_x$, $h_y$, and $h_z$ exceeds 500 μm, this is not preferable because the thickness of a sheeting becomes excessively large and a soft sheeting is not easily obtained.

In the case of the present invention, it is preferable that triangular-pyramidal cube-corner retroreflective elements have an optical axis tilting by 0.5° to 12°.

When triangular-pyramidal reflective elements superior in rotation angularity are necessary, it is preferable that the tilt of the above optical axis ranges between 0.5° and 1.5° and more preferable that the tilt ranges between 0.6° and 1.4°.

When triangular-pyramidal reflective elements superior in entrance angularity are necessary, it is preferable that the tilt of the above optical axis ranges between 4° and 12° and more preferable that the tilt ranges between 5° and 10°.

Though three prism face angles formed when three reflection side faces (a1, b1, and c1) or (a2, b2, and c2) serving as prism faces of CC reflective elements cross each other substantially become orthogonal, it is preferable that they are not always strictly orthogonal (90.000°) to each other but it is preferable to provide a very-slight angular deviation from a right angle. By providing a very-slight angular deviation to the prism face angles, it is possible to properly diverge the light reflected from obtained CC reflective elements. However, when the angular deviation is excessively increased, the light reflected from the obtained CC reflective element is excessively diverged and the retroreflective performance is deteriorated. Therefore, it is preferable that at least one prism face angle formed when these three reflection side faces (a1, b, and c1) or (a2, b2, and c2) cross each other generally ranges between 89.5° and 90.5° and more preferable that the angle ranges between 89.7° and 90.3° and is slightly deviated from 90.000°.

It is allowed to use any type of mirror reflective layer as a mirror reflective layer on the surface of retroreflective elements of the present invention and the type is not restricted. However, it is preferable to use a mirror reflective layer made of a metal such as aluminum, copper, silver, or nickel.

It is preferable that the thickness of a mirror reflective layer ranges between 800 and 1,500 Å. When the thickness of the mirror reflective layer is 800 Å or more, this is preferable because the reflection efficiency of the mirror reflective layer is sufficient and the quantity of light passing through the layer is very little. When the thickness is 800 Å or less, this is preferable because the retroreflective efficiency is not deteriorate or the appearance does not become dark.

Many triangular-pyramidal cube-corner retroreflective elements of the present invention are collected and used as a CC retroreflective body. Moreover, it is allowed to form many CC reflective elements into a triangular-pyramidal cube-corner retroreflective sheeting and use it by setting it on an object such as a vehicle or traffic sign. Furthermore, it is allowed to use many CC reflective elements by directly forming them on an object. Therefore, though a mode to be used is not restricted, CC reflective elements are generally formed into a sheeting and used.

Figure 4:
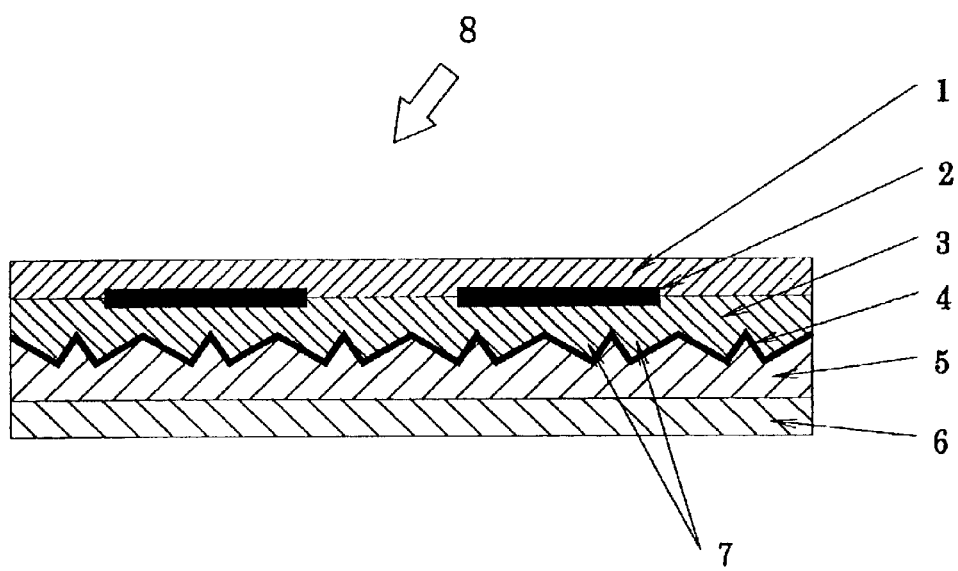
FIG. 4 is a sectional view showing a structure of a mode of a triangular-pyramidal cube-corner retroreflective sheeting in which CC reflective elements of the present invention are arranged.

Then, a mode of a preferable structure of a triangular-pyramidal cube-corner retroreflective sheeting on which CC reflective elements of the present invention are arranged is described below by referring to FIG. 4 showing a sectional view of the mode.

In FIG. 4, symbol 3 denotes a reflective element layer on which triangular-pyramidal reflective elements ($R_1$ and $R_2$) (7) of the present invention are arranged in the closest-packed state, 4 denotes a mirror reflective layer present on the reflection side face of the reflective elements, and 8 denotes an entrance direction of light. It is possible to provide a surface protective layer (1), a print layer (2) for communicating information to an observer or coloring a sheeting, an adhesive layer (5) used to attach a retroreflective sheeting to other structure, and a stripping-material layer (6) for protecting the adhesive layer (5) until the retroreflective sheeting is attached.

It is possible to use a resin same as that used for a retroreflective element layer (3) for the above surface protective layer (1). Moreover, to improve the weather resistance, it is possible to use any one of an ultraviolet absorbing agent, light stabilizer, and anti-oxidizing agent or use a combination of them.

It is generally possible to set the print layer (2) between the surface protective layer (1) and the retroreflective element (3), on the surface of the light-entrance side of the surface protective layer (1) or between reflection side faces (a, b, and c) and a mirror reflective layer. In general, it is possible to set the print layer (2) by means of gravure printing, screen printing, or ink-jet printing.

It is possible to properly select a publicly-known material for the adhesive layer (5) and stripping-material layer (6) used for the adhesive used to attach a retroreflective sheeting of the present invention to a metallic plate, wooden plate, glass plate, or plastic plate.

A triangular-pyramidal cube-corner retroreflective sheeting on which CC reflective elements of the present invention are arranged is used so that light (8) comes in from the top of the surface protective layer (1). Therefore, it is possible to manufacture the above retroreflective sheeting by using a cube-corner molding die in which the above CC reflective elements are arranged on a metallic belt as concave shapes obtained by reversing shapes of the CC reflective elements, heating a soft proper resin sheeting superior in optical transparency and uniformity and pressing the resin sheeting to be described later against the molding die, reversing and transferring the shape of the die to the resin sheeting to obtain a substrate sheeting, and forming a mirror reflective layer on the substrate sheeting in accordance with, for example, a method such as aluminizing.

Typical manufacturing methods of the above cube-corner molding die are described in, for example, the above Stamm's patent in detail. Also in the case of the present invention, it is possible to manufacture a mother die by a method conforming to the above publicly-known methods.

The above mother die is also formed through copying as an electroforming die whose convex and concave portions are reversed by the electroforming method. A plurality of electroforming dies are accurately cut and then, the dies can be used by combining and joining them up to a final die size for molding a microprism sheeting with a synthetic resin.

A combined electroforming die is used to mold a synthetic resin as a synthetic-resin-molding die. The synthetic-resin molding method can use compression molding or injection molding.

The compression molding can be performed by inserting a formed thin-wall nickel electroforming die having a thickness of approx. 1 mm, a synthetic-resin sheeting having a predetermined thickness, and a silicone-rubber sheeting having a thickness of approx. 5 mm serving as a cushion material into a compression-molding press heated to a predetermined temperature and then, preheating the sheeting for 30 sec at a pressure of 10 to 20% of a molding pressure, then heating and pressuring the sheeting for approx. 2 min under conditions of 180° to 230° C. and 10 to 30 kg/cm². Thereafter, by cooling the sheeting up to room temperature while pressing it and releasing the pressure, it is possible to obtain a molded prism.

Moreover, it is possible to obtain a continuous sheet-like product by joining a thin-wall electroforming die having a thickness of approx. 0.5 mm formed by the above method in accordance with the above welding method to form an endless belt die, and setting the belt die to a pair of rollers constituted by a heating roller and a cooling roller and rotating the rollers, supplying melted synthetic resin to the belt die on the heating roller in the form of a melted sheeting, pressure-molding the sheeting with one or more silicone rollers, then cooling the sheeting to a glass transition point or lower on the cooling roller, and removing the sheeting from the belt die.

The synthetic resin which can be used to mold the above substrate sheeting is not restricted. However, it is preferable to use a synthetic resin having optical transparency and uniformity such as any one of polycarbonate resin, vinyl-chloride resin, (meth)acrylic resin, epoxy resin, styrene resin, polyester resin, fluorocarbon resin, olefin resin such as polyethylene resin or polypropylene resin, cellulose-based resin, and urethane resin.

A triangular-pyramidal cube-corner retroreflective sheeting of the present invention allows a mirror reflective layer made of a metal such as aluminum, copper, silver, or nickel to be formed on the surface of the above substrate retrore-flective elements thus obtained by using means such as vacuum deposition, chemical plating, or sputtering. Among methods for forming a mirror reflective layer, the vacuum deposition method using aluminum is preferable because a deposition temperature can be lowered and thereby a thermal deformation of retroreflective elements in a deposition step can be minimized and moreover, the color tone of an obtained mirror reflective layer becomes the most bright.

A continuous deposition treatment apparatus for forming the above aluminum mirror reflective layer is constituted by a vacuum vessel in which a vacuum degree can be kept at approx. 7 to 9×10⁻⁴ mmHg, a delivery unit for delivering a prism raw sheeting formed by two layers such as a substrate sheeting set in the vacuum vessel and a surface protective layer formed on the surface of the light-incoming side of the substrate sheeting, a winding unit for winding a deposition-treated prism raw sheeting, and a heating unit set between the vacuum vessel and these units and capable of melting aluminum with an electric heater in a graphite crucible. Pure aluminum pellets having a purity of 99.99 wt % or more and granular metallic titanium are put in the graphite crucible so that the weight ratio is 100:1 so that they can be deposited on a reflection side face as a mirror reflective layer by aluminum atoms melted and evaporated at a voltage of 350 to 360 VAC, a current of 115 to 120 A, and a treatment rate of 30 to 70 m/min.

A temperature of 950° to 1,100° C. can be used as the above aluminum melting temperature.

It is also possible to cool the deposition-treated prism raw sheeting with a water-cooling roller before it is wound on a roller by a winding unit.

Moreover, it is possible to set a single prism raw sheeting in a bell-shaped vacuum vessel and vacuum-deposit the sheeting in the form of a single sheeting. The same condition as described above can be used as the deposition conditions in this case.

It is possible to further set an adhesive layer and a stripping-material layer to cube-corner retroreflective elements provided with a mirror reflective layer after applying preservation treatment to the elements according to necessity.

The present invention is further specifically described below in accordance with embodiments.

Embodiment 1:

Parallel grooves respectively having a V-shaped cross section were cut on a 100 mm-square brass plate with the surface flatly cut along a first direction (y-direction in FIG. 1) and a second direction (z-direction in FIG. 1) at a repetitive pattern in accordance with the fly cutting method so that repetitive pitches of the first and second directions were 164.18 μm, depths ($h_y$ and $h_z$) of the grooves were 80 μm, and the crossing angle between the first and second directions was 50.68° by using a diamond cutting tool having a tip angle of 56.63°.

Thereafter, V-shaped parallel grooves were cut in a third direction (x-direction in FIG. 1) so that a repetitive pitch (repetitive pitch of line x in FIG. 1) was 191.81 μm, the depth ($h_x$) of the grooves was 88 μm, and crossing angles between the first and second direction on one hand and the third direction on the other were 64.66° by using a diamond cutting tool having a tip angle of 77.04° to form a mother die on which many convex triangular-pyramidal cube corners having a height ($h_x$) of 88 μm from the virtual face ($S_x$–$S_x'$) of the triangular-pyramidal reflective elements were arranged in the closest-packed state on the brass plate. The optical-axis tilt angle θ of the triangular-pyramidal reflective elements was +7° and prism face angles of three reflection side faces constituting a triangular pyramid were 90°. Moreover, the ratio $h_{max}/h_{min}$ between the maximum value $h_{max}$ and minimum value $h_{min}$ of heights of the elements was 1.1.

A convex cube-corner molding die which was made of nickel and whose shape was reversed was formed in accordance with the electroforming method by using the above brass mother die. A polycarbonate-resin sheeting ("Iupilon H3000" made by Mitsubishi Engineering-Plastics Corp.) having a thickness 200 μm was compression-molded at a molding temperature of 200° C., a molding pressure of 50 kg/cm2, and a molding time of 3 min by using the above molding die and moreover, an acrylic film [Sanduren HBL008 made by Mitsubishi Rayon Co., Ltd.] was laminated under the same conditions. Thereafter, the resin sheeting was cooled up to 30° C. while pressurized and then taken out to form a prism raw sheeting constituted by two layers such as a surface protective layer having a thickness of approx. 50 μm and a reflective element layer on which cube corners whose support layer has a thickness of approx. 150 μm and h of 80 μm were arranged in the closest-packed state.

The prism raw sheeting was set to a vacuum deposition unit constituted by a heating unit capable of melting aluminum with an electric heater in a graphite crucible set in a vacuum vessel capable of keeping a vacuum degree at approx. 9×10⁻⁴ mmHg. Pure aluminum pellets having a purity of 99.99% or higher and granular metallic titanium were put in the graphite crucible so that the weight ratio between them was 100:1, and three reflection side faces of CC reflective elements were deposited as a mirror reflective layer with aluminum atoms vacuum-deposited and evaporated at a voltage of 350 VAC, a current of 115 to 120 A, and a processing time of 5 min. In this case, the thickness of an aluminized film was 1,100 Å.

A triangular-pyramidal cube-corner retroreflective sheeting was formed by layering an acrylic pressure-sensitive adhesive (Nissetsu KP1818 made by Nippon Carbide Industries Co., Inc.) having a thickness of 60 μm and a stripping sheeting made of polypropylene having a thickness of 100 μm (made by Okura Industrial Co., Ltd.) on the deposition face of the deposition-treated prism raw sheeting.

Embodiment 2:

Parallel grooves with V-shaped sectional form were cut on a 100 mm-square brass plate with the surface flatly cut in a first direction (y-direction in FIG. 1) and a second direction (z-direction in FIG. 1) at a repetitive pattern in accordance with the fly cutting method by using a diamond cutting tool having a tip angle of 68.53° so that repetitive pitches in the first and second direction were 210.87 μm, depths ($h_y$ and $h_z$) of the grooves were 100 μm, and the crossing angle between the first and second directions was 58.76°.

Thereafter, V-shaped parallel grooves were cut along a third direction (x-direction in FIG. 1) so that a repetitive pitch (repetitive pitch of line x in FIG. 2) was 214.92°, the depth ($h_x$) of the grooves was 105 μm, and crossing angles between the first and second directions on one hand and the third direction on the other were 60.62° to form a mother die on which many convex triangular-pyramidal reflective elements respectively having a height ($h_x$) of 105 μm from a virtual face $S_x$–$S_x'$) of the triangular-pyramidal reflective elements were arranged in the closest-packed state on the brass plate. The optical-axis tilt angle θ of the triangular-pyramidal reflective elements was +1° and prism face angles of three faces constituting a triangular pyramid were all 90° and $h_{max}/h_{min}$ was 1.1.

A triangular-pyramidal cube-corner retroreflective sheeting was formed by using the above brass mother die and the same method as the case of Embodiment 1.

COMPARATIVE EXAMPLE

Parallel grooves respectively having a V-shaped cross section were cut on a 100 mm-square brass plate with the surface flatly cut along a first direction (y-direction in FIG. 1) and a second direction (z-direction in FIG. 1) at a repetitive pattern in accordance with the fly cutting method so that repetitive pitches of the first and second directions were 169.71 μm, depths ($h_y$ and $h_z$) of the grooves were 80 μm, and the crossing angle between the first and second directions was 60.00° by using a diamond cutting tool having a tip angle of 70.53°.

Thereafter, V-shaped parallel grooves were cut in a third direction (x-direction in FIG. 1) so that a repetitive pitch (repetitive pitch of line x in FIG. 2) was 169.71 μm, the depth ($h_x$) of the grooves was 80 μm, and crossing angles between the first and second direction on one hand and the third direction on the other were 60.00° by using a diamond cutting tool having a tip angle of 77.04° to form a mother die on which many convex triangular-pyramidal cube corners having a height ($h_x$) of 80 μm from the virtual face ($S_x$–$S_x'$) of the triangular-pyramidal reflective elements were arranged in the closest-packed state on the brass plate. The optical-axis tilt angle θ of the triangular-pyramidal reflective elements was +7°, prism face angles of three reflection side faces constituting a triangular pyramid were 90°, and heights of the elements were all equal to each other. A triangular-pyramidal cube-corner retroreflective sheeting was formed by using the above brass mother die and the same method as the case of Embodiment 1.

Table 1 shows values obtained by measuring retroreflection coefficients of triangular-pyramidal retroreflective sheetings prepared for the above Embodiments 1 and 2 and Comparative Example [every unit of reflection brightness is $(cd/L_x*m^2)$.]

The retroreflection coefficients were measured in accordance with the photometric measuring method specified in JIS Z 8714 "Retroreflectors-Optical properties-Measuring method" by setting combinations of observation angles and entrance angles to 0.2°/5° and 0.2°/30°.

Figure 5:
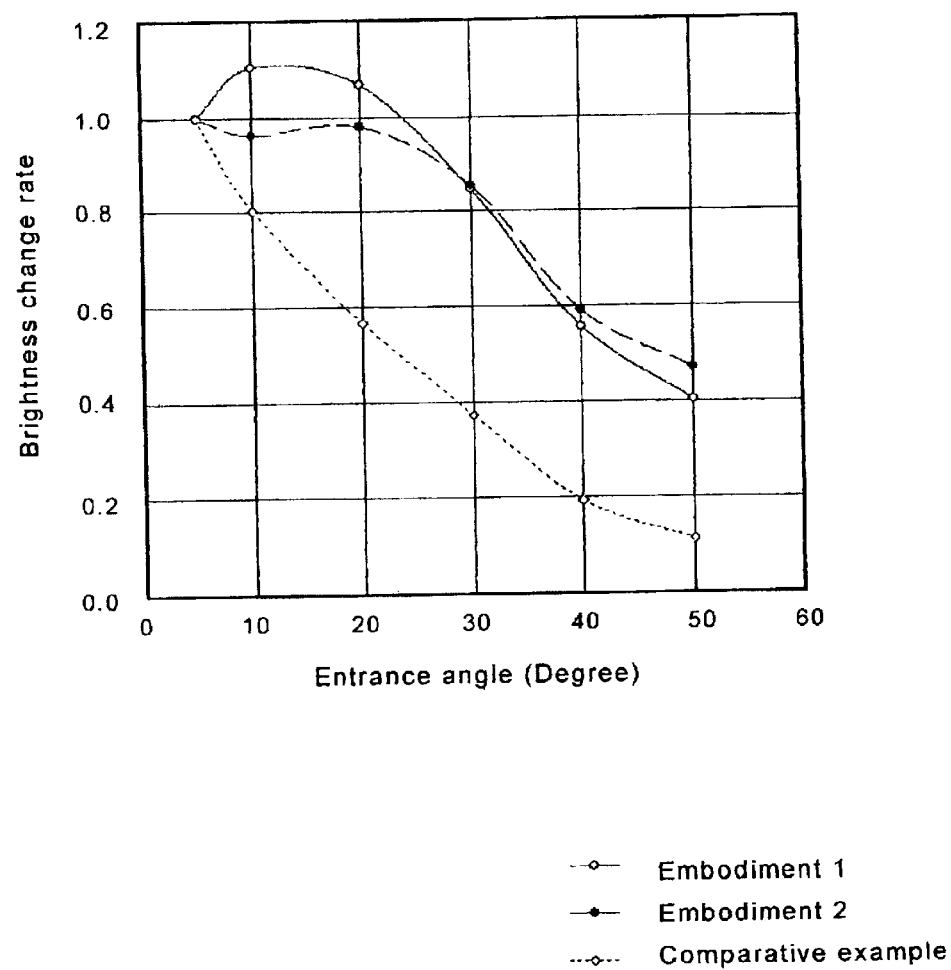
FIG. 5 is an illustration showing entrance angularities of triangular-pyramidal cube-corner retroreflective elements formed for Embodiment 1, Embodiment 2, and Comparative Example 1.

To observe entrance angularities of triangular-pyramidal retroreflective sheetings prepared for the above Embodiments 1 and 2 and Comparative Example, retroreflection coefficients of various samples were measured by changing entrance angles from 5° to 10°, 20°, 30°, 40°, and 50° at an observation angle of 0.2°. In FIG. 5, entrance angles are assigned to the abscissa and the ordinate shows values obtained by dividing retroreflection coefficients at various entrance angles by the retroreflection coefficient at an entrance angle of 5° as brightness change rates.

From Table 1 and FIG. 5, it is found that the retroreflective sheetings prepared for Embodiments 1 and 2 of the present invention are extremely superior in reflection performance particularly at entrance angles of 10° to 30° for which visibility is particularly requested on a traffic sign and the reflection performance is superior to the reflection performance at the front (entrance angle of 5°.)

The above characteristic makes it possible to extremely improve the visibility from a vehicle running on an adjacent roadway.

However, in the case of the retroreflective sheeting prepared for Comparative Example, the reflection performance is deteriorated as an entrance angle increases and inferior to the reflection performance at the front (entrance angle of 5°) at entrance angles of 10° to 30° at which the visibility is important in the case of a traffic sign.

TABLE 1

| | | Embodiment 1 | Embodiment 2 | Comparative Example |
|---|---|---|---|---|
| Entrance angle | 5° | 816 | 1025 | 1138 |
| | 30° | 691 | 876 | 424 |

The present invention is directed to triangular-pyramidal cube-corner retroreflective elements characterized in that triangular-pyramidal cube-corner retroreflective elements protruding beyond a common bottom plane ($S_x$–$S_x'$) share one base edge (x) on the bottom plane $S_x$–$S_x'$) and are arranged in the closest-packed state so as to be faced each other, the bottom plane $S_x$–$S_x'$) is a common plane including a plurality of the base edges (x,x, . . . ) shared by the triangular-pyramidal reflective elements, two triangular-pyramidal reflective elements faced each other include the shared base edges (x,x, . . . ) on the bottom plane ($S_x$–$S_x'$) and form a substantially same-shape element pair faced each other so as to be symmetric to planes ($L_x$—$L_x$, $L_x$—$L_x$, . . . ) vertical to the bottom plane ($S_x$–$S_x'$), and when assuming the height from the bottom plane $S_x$–$S_x'$) including the base edges (x,x, . . . ) shared by the two triangular-pyramidal reflective elements faced each other up to apexes ($H_1$ and $H_2$) of the triangular-pyramidal reflective elements as $h_x$, the height from a bottom plane ($S_y$–$S_y'$) including other base edges (y,y, . . . ) of the triangular-pyramidal reflective elements up to the apexes ($H_1$ and $H_2$) of the triangular-pyramidal reflective elements as $h_y$, and the height from a bottom plane ($S_z$–$S_z'$) including still other base edges (z,z, ...) of the triangular-pyramidal reflective elements up to the apexes ($H_1$ and $H_2$) of the triangular-pyramidal reflective elements as $h_z$, at least any two of $h_x$, $h_y$, and $h_z$ are substantially different from each other and a mirror reflective layer is formed on reflective side faces of the triangular-pyramidal reflective elements.

Thereby, triangular-pyramidal cube-corner retroreflective elements of the present invention are extremely superior in reflection performance at an entrance angle of 30° or more, preferably 40° or more.

What is claimed is:

1. Triangular-pyramidal cube-corner retroreflective elements characterized in that triangular-pyramidal cube-corner retroreflective elements protruding beyond a common bottom plane ($S_x$–$S_x'$) share one base edge (x) on said bottom plane ($S_x$–$S_x'$) and are arranged in the closest-packed state so as to be faced each other, said bottom plane ($S_x$–$S_x'$) is a common plane including a plurality of the base edges (x,x, ...) shared by said triangular-pyramidal reflective elements, two triangular-pyramidal reflective elements faced each other include said shared base edges (x,x, ...) on the bottom plane ($S_x$–$S_x'$) and form a substantially same-shape element pair faced each other so as to be symmetric to planes ($L_x$—$L_x$, $L_x$—$L_x$, ...) vertical to the bottom plane ($S_x$–$S_x'$), and when assuming the height from the bottom plane ($S_x$–$S_x'$) including the base edges (x,x, ...) shared by the two triangular-pyramidal reflective elements faced each other up to apexes ($H_1$ and $H_2$) of the triangular-pyramidal reflective elements as $h_x$, the height from a bottom plane ($S_y$–$S_y'$) including other base edges (y,y, ...) of the triangular-pyramidal reflective elements up to the apexes ($H_1$ and $H_2$) of the triangular-pyramidal reflective elements as $h_y$, and the height from a bottom plane ($S_z$–$S_z'$) including still other base edges (z,z, ...) of the triangular-pyramidal reflective elements up to the apexes ($H_1$ and $H_2$) of the triangular-pyramidal reflective elements as $h_z$, at least any two of $h_x$, $h_y$, and $h_z$ are substantially different from each other and a mirror reflective layer is formed on reflective side faces of the triangular-pyramidal reflective elements.

2. The triangular-pyramidal cube-corner retroreflective elements according to claim 1, characterized in that the optical axis of the triangular-pyramidal reflective elements tilts so that the angle formed between the optical axis and a vertical line extended from apexes ($H_1$ and $H_2$) of the elements to the bottom plane ($S_x$–$S_x'$) of the optical axis ranges between 0.5° and 12° in the direction for the difference (q-p) between the distance (q) from the intersection (Q) of the optical axis and the bottom plane ($S_x$–$S_x'$) up to base edges (x,x, ...) shared by said element pair and the distance (p) from the intersection (P) of the vertical line and the bottom plane ($S_x$–$S_x'$) up to the base edges (x,x, ...) shared by said element pair to become plus (+) or minus (−).

3. The triangular-pyramidal cube-corner retroreflective elements according to claim 2, characterized in that the optical axis of said triangular-pyramidal reflective elements tilts so that the angle formed between said optical axis and said vertical line ranges between 0.5° and 12°.

4. The triangular-pyramidal cube-corner retroreflective elements according to claim 2, characterized in that the optical axis of said triangular-pyramidal reflective elements tilts so that the angle formed between said optical axis and said vertical line ranges between 4° and 12°.

5. The triangular-pyramidal cube-corner retroreflective elements according to any one of claims 1 to 4, characterized in that the optical axis of said triangular-pyramidal reflective elements tilts in the direction for the difference (q−p) between the distance (q) from the intersection (Q) of said optical axis and said bottom plane ($S_x$–$S_x'$) up to base edges (x,x, ...) shared by said element pair and the distance (p) from the intersection (P) of a vertical line extended from apexes ($H_1$ and $H_2$) of said elements to said bottom plane ($S_x$–$S_x'$) and the bottom plane $S_x$–$S_x'$) up to base edges (x,x, ...) shared by said element pair to become plus (+) and $h_x$ is substantially larger than $h_y$ and $h_z$.

6. The triangular-pyramidal cube-corner retroreflective elements according to claim 5, characterized in that said $h_y$ and $h_z$ are substantially equal to each other and said $h_x$ is substantially larger than said $h_y$ and $h_z$.

7. The triangular-pyramidal cube-corner retroreflective elements according to any one of claims 1 to 4, characterized in that the optical axis of said triangular-pyramidal reflective elements tilts in the direction for the difference (q−p) between the distance (q) from the intersection (Q) of the optical axis and the bottom plane $S_x$–$S_x'$) up to base edges (x,x, ...) shared by said element pair and the distance (p) from the intersection (P) of a vertical line extended from apexes ($H_1$ and $H_2$) of said elements to said bottom plane ($S_x$–$S_x'$) and said bottom plane ($S_x$–$S_x'$) up to base edges (x,x, ...) shared by said element pair to become minus (−) and $h_x$ is substantially smaller than $h_y$ and $h_z$.

8. The triangular-pyramidal cube-corner retroreflective elements according to claim 7, characterized in that said $h_y$ and $h_z$ are substantially equal to each other and said $h_x$ is substantially smaller than said $h_y$ and $h_z$.

9. The triangular-pyramidal cube-corner retroreflective elements according to claim 8, characterized in that when assuming the maximum one of said $h_x$, $h_y$, and $h_z$ as $h_{max}$ and the minimum one of them as $h_{min}$, the following expression is effectuated, $$1.03 < h_{max}/h_{min} < 1.3$$

10. The triangular-pyramidal cube-corner retroreflective elements according to claim 9, characterized in that said $h_x$, $h_y$ and $h_x$ respectively range between 50 and 500 μm (both included).

11. The triangular-pyramidal cube-corner retroreflective sheeting according to claim 10, characterized in that said two confronting triangular-pyramidal cube-corner retroreflective elements which share base edges (x,x, ...), are arranged in the closest-packed state to form a sheeting.

* * * * *

UNITED STATES PATENT AND TRADEMARK OFFICE
CERTIFICATE OF CORRECTION

PATENT NO. : 6,817,724 B2
DATED : November 16, 2004
INVENTOR(S) : Ikuo Mimura et al.

It is certified that error appears in the above-identified patent and that said Letters Patent is hereby corrected as shown below:

<u>Title page,</u>
Item [57], ABSTRACT,
Line 1, "a" should be deleted.

<u>Column 4,</u>
Line 8, "$S_x-S_x'$)" should read -- ($S_x-S_x'$) --.

<u>Column 6,</u>
Line 59, "($S_x-S_x'$)" should read -- ($S_x-S_x'$) --.

<u>Column 7,</u>
Line 64, "slight" should read -- slightly --.

<u>Column 8,</u>
Lines 17 and 25, "$S_x-S_x'$)" should read -- ($S_x-S_x'$) --; and
Line 40, "$h_x$" should read -- $h_z$ --.

<u>Column 9,</u>
Line 59, "deteriorate" should read -- deteriorated --.

<u>Column 13,</u>
Line 29, "$S_x-S_x'$)" should read -- ($S_x-S_x'$) --.

<u>Column 14,</u>
Lines 50, 52 and 60, "$S_x-S_x'$)" should read -- ($S_x-S_x'$) --.

UNITED STATES PATENT AND TRADEMARK OFFICE
CERTIFICATE OF CORRECTION

PATENT NO. : 6,817,724 B2
DATED : November 16, 2004
INVENTOR(S) : Ikuo Mimura et al.

It is certified that error appears in the above-identified patent and that said Letters Patent is hereby corrected as shown below:

Column 16,
Lines 16 and 29, "$S_x-S_x'$)" should read -- ($S_x-S_x'$) --; and
Line 48, "$h_x$" should read -- $h_z$ --.

Signed and Sealed this

Nineteenth Day of April, 2005

JON W. DUDAS
*Director of the United States Patent and Trademark Office*